United States Patent
Kawachiya

(10) Patent No.: US 7,685,565 B1
(45) Date of Patent: Mar. 23, 2010

(54) RUN TIME RECONFIGURATION OF COMPUTER INSTRUCTIONS

(75) Inventor: Kiyokuni Kawachiya, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/407,431

(22) Filed: Mar. 19, 2009

(51) Int. Cl.
G06F 9/44 (2006.01)
G06F 9/45 (2006.01)

(52) U.S. Cl. .................................. 717/110; 717/136
(58) Field of Classification Search .................. None
See application file for complete search history.

(56) References Cited

U.S. PATENT DOCUMENTS

| | | | |
|---|---|---|---|
| 5,280,617 A | 1/1994 | Brender et al. | |
| 5,586,020 A | 12/1996 | Isozaki | |
| 5,999,737 A | 12/1999 | Srivastava | |
| 6,029,004 A | 2/2000 | Bortnikov et al. | |
| 6,158,048 A | 12/2000 | Lueh et al. | |
| 6,363,397 B1 | 3/2002 | Kitayama | |
| 6,412,108 B1 | 6/2002 | Blandy et al. | |
| 6,425,057 B1 | 7/2002 | Cherkasova et al. | |
| 6,567,820 B1 | 5/2003 | Scheifler et al. | |
| 6,654,954 B1 | 11/2003 | Hicks | |
| 6,934,940 B2 | 8/2005 | Bates et al. | |
| 7,146,613 B2 | 12/2006 | Chauvel et al. | |
| 7,150,012 B2 | 12/2006 | Hill | |
| 7,278,138 B2 | 10/2007 | Kawahito et al. | |
| 7,318,143 B2 | 1/2008 | Biles et al. | |
| 7,430,734 B2 | 9/2008 | Sollich | |
| 2004/0015912 A1 | 1/2004 | Bottomley et al. | |
| 2004/0015918 A1* | 1/2004 | Kawahito et al. | 717/151 |
| 2004/0040029 A1 | 2/2004 | Debbabi et al. | |
| 2005/0166195 A1* | 7/2005 | Kawahito | 717/154 |
| 2008/0189696 A1* | 8/2008 | De Sutter et al. | 717/168 |

* cited by examiner

*Primary Examiner*—Philip Wang
(74) *Attorney, Agent, or Firm*—Dillon & Yudell LLP

(57) ABSTRACT

Systems, methods, and computer program products for reconfiguring computer instructions to accelerate a given instruction set. At run time, during the loading of a class (in the context of objected oriented programming, for example), method invocations that have arguments that meet certain conditions are replaced by faster processing methods, which are made available in a support class that replaces the originally invoked class. In one embodiment, conditions to be met by arguments include that an argument refer to a constant value, be at a specified position in an argument list, or exhibit a pre-determined pattern, form, or type (e.g., be an alphanumeric string only, an integer in a given range, or a specific integer).

1 Claim, 7 Drawing Sheets

```
class Bypass {//support class prepared by check and conversion module 107
    static String replaceFirst(String str, String from, String to) {
    //to perform high-speed replacement processing assuming that a "from" string is not a regular expression.
        int idx = str.indexOf(from);
        if (idx < 0) return str;
        return str.substring(0, idx)+ to + str.substring(idx+from.length());
    }}
```

```
class Bypass2 {//support class prepared by check and conversion module 107
    static double square(double d) {//when the index of power is 2, convert to square expression
        return d * d;
    }}
```

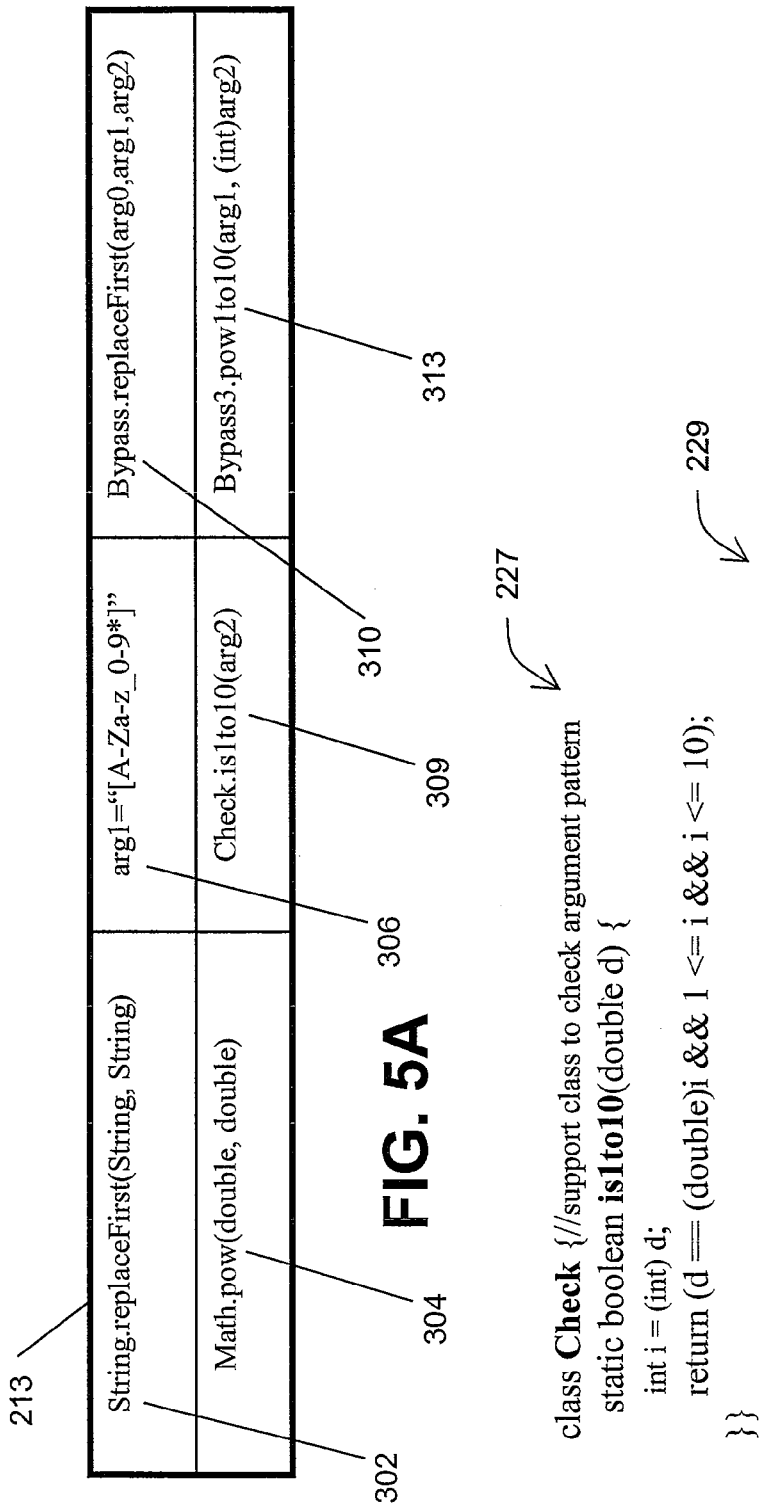

```
Static String getAttrName(String methodName) {
  if (methodName.startsWith("get"))
    return methodName.replaceFirst("get", ""); //heavy method
  else return null;
}
```

FIG. 6A

```
static String getAttrName(String methodName) {
  if (methodName.startsWith("get"))
    return Bypass.replaceFirst(methodName, "get", ""); //
  else return null;
}
```

FIG. 6B

RUN TIME RECONFIGURATION OF COMPUTER INSTRUCTIONS

BACKGROUND

1. Technical Field

Embodiments of the invention relate generally to data processing systems and associated methods. In particular, the invention is directed to systems, methods, and computer program products for reconfiguring computer programming instructions to improve the performance of data processing systems.

2. Description of the Related Art

Data processing systems can be found in a variety devices, such as mobile telephones, TV set top boxes, pagers, coffee makers, toasters, in-car systems, vehicle management control systems, computers (servers, desktops, or laptops), and personal digital assistants (PDAs). New hardware architectures for data processing systems are constantly being developed since there is an ever present desire for computation capacity, as well as other requirements such as safety-critical systems, autonomy management, and power saving features.

Data processing systems are typically designed to cooperate with software components to provide a desired functionality. Software is essentially computer instructions provided to a data processing system in a medium readable by the data processing system. Software is often referred to as a "computer program," an "application," or "code." Data processing devices operate using machine code that is specific to the particular hardware platform of the data processing system. "Native code" is a term generally referring to the code that runs on a specific hardware platform after it is compiled. To facilitate application development, and to re-use applications to run on different host platforms, it is desirable that an application be transportable between different host hardware (including processors and other supporting devices). The Java programming language provides a mechanism to distribute software to different computing platforms, which may contain a variety of central processing units and operating system architectures. Java is a trademark of Sun Microsystems, Inc.

To enable a Java application to execute on different types of data processing systems, a Java compiler generates bytecode instructions that are non-specific to particular computer architectures. Bytecode instructions are designed to be interpreted on any machine and translated at run time into native machine code. A compiled Java program is distributed as a set of class files. A development environment, such as the Java Development Kit (JDK) available from Sun Microsystems, Inc., can be used to build Java bytecode from Java language source code and libraries. The JVM converts the application's bytecode into native code appropriate for the host hardware.

With Java or other similar environments, the execution of the code via a virtual machine running on top of the hardware platform is generally slower than native code execution. To address this issue in the context of virtual machines, a number of virtual machine implementation variants have been devised, such as Just-In-Time (JIT) compilers, Dynamic Adaptive Compilation (DAC), and variations of Ahead-Of-Time (AOT) compilation. These methods generally include some aspect of compilation of the machine language of the virtual machine, which allows native code to be executed versus the instruction-by-instruction interpretation that may each result in multiple native instructions. Additionally, techniques are known for optimizing bytecode for execution in a JVM. Other approaches to increasing the speed of execution of applications involve reconfiguring a program by replacing part of the program, at run time, with other code according to some optimization policy.

Therefore, there is a continuing desire for systems and methods for expediting execution of applications generally, and accelerating execution of applications processed by virtual machines in particular.

SUMMARY OF ILLUSTRATIVE EMBODIMENTS

Disclosed are systems, methods, and computer program products for reconfiguring computer instructions to accelerate a given instruction set. At run time, during the loading of a class (in the context of objected oriented programming, for example), method invocations that have arguments that meet certain conditions are replaced by faster processing methods, which are made available in a support class that replaces the originally invoked class. In one embodiment, conditions to be met by arguments include that an argument refer to a constant value, be at a specified position in an argument list of a method call, and exhibit a pre-determined pattern, form, or type (e.g., be an alpha-numeric string only, an integer in a given range, or a specific integer).

In one aspect, the invention is directed to a process of accelerating the execution of a computing task by converting a general purpose Java method to a more specific purpose Java method. The process involves providing a pattern table, wherein each record entry of the pattern table associates a method of a Java class with: (a) conditions to be satisfied by an argument of the method, and (b) a conversion procedure that converts a general purpose Java method invocation to a specific purpose Java method invocation. The process also includes loading a Java class having at least one general purpose Java method invocation, and determining whether the general purpose Java method corresponds to a named method of a Java class included in the pattern table. If the general purpose Java method is included in the pattern table, the process includes determining whether an argument of the general purpose method invocation satisfies the conditions associated with the method, wherein said conditions include that the argument is constant, is at a position specified by the pattern table, and matches a specified pattern. If the argument meets the conditions, the process then involves replacing the general purpose method invocation with a specific purpose Java method invocation according to the conversion procedure specified in the pattern table.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein:

FIGS. 4A and 4B show exemplary instructions that can be used with the components of FIG. 2.

FIG. 5A shows another exemplary data structure that can be used with the components of FIG. 2.

FIG. 5B shows exemplary instructions that can be used with components of FIG. 2.

FIGS. 6A and 6B show yet other exemplary instructions that can be used with the components of FIG. 2.

DETAILED DESCRIPTION OF ILLUSTRATIVE EMBODIMENTS

Figure 1:
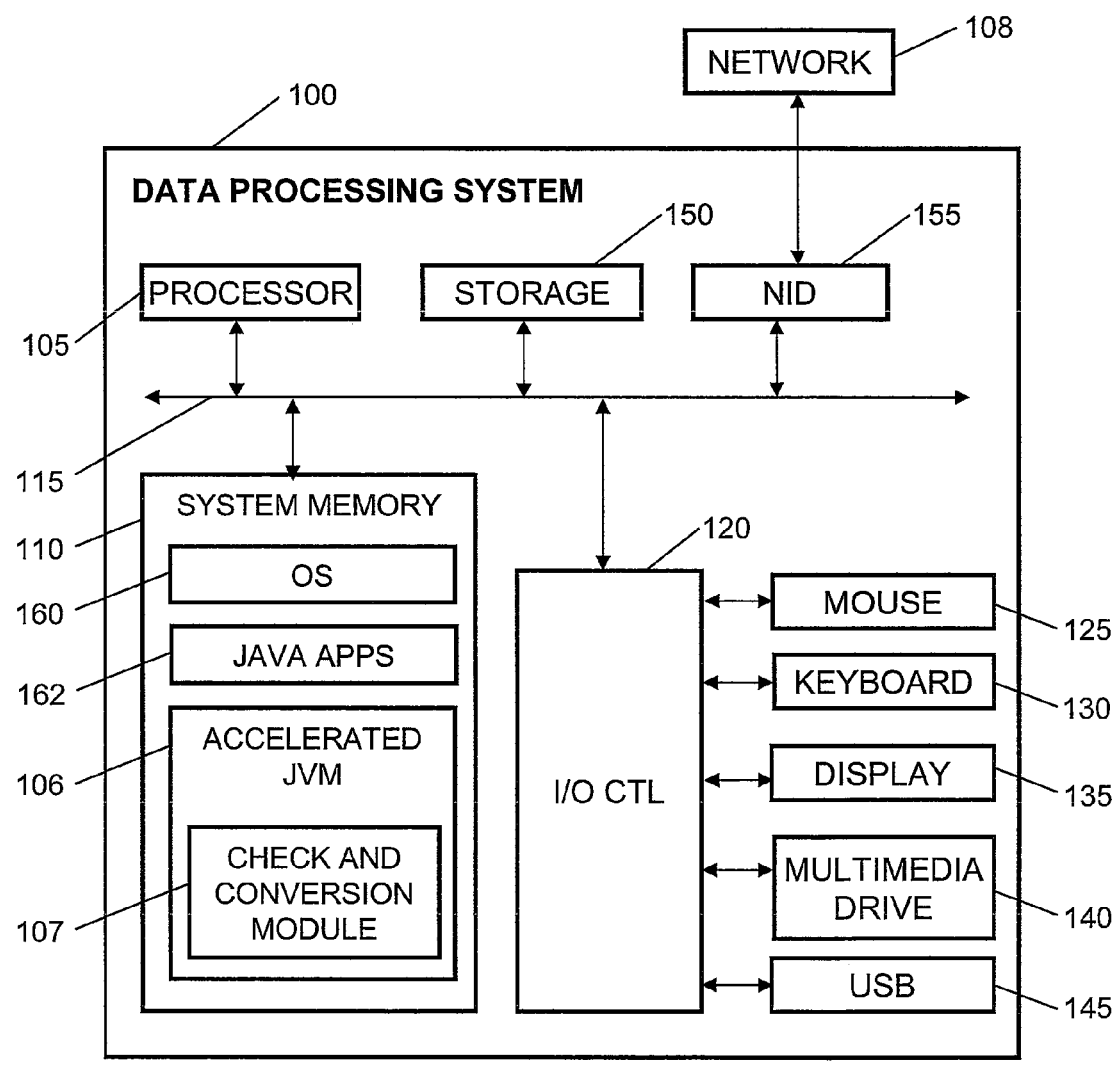
FIG. 1 is a schematic diagram of a data processing system with hardware and software components for implementing embodiments of the invention.

Disclosed are systems, methods, and computer program products for reconfiguring computer instructions to accelerate a given instruction set. At run time, during the loading of a class (in the context of objected oriented programming, for example), method invocations that have arguments that meet certain conditions are replaced by faster processing methods, which are made available in a support class that replaces the originally invoked class.

Additionally, generally, disclosed are systems, methods, and computer program products for accelerating program execution in platform-independent systems. Data processing systems (DPS) having a native platform, such as the hardware and operating system of the DPS, may also be equipped with an actual or virtual machine running on top of the native platform to provide program translation services. Inventive embodiments disclosed here provide technology for accelerating operations associated with program code to speed the end-to-end execution time of an application.

In particular, some general-purpose Java methods are computationally intensive (for convenience, such methods will be referred at times herein as "heavy methods"). For example, the method String.replaceFirst (String regex, String replacement) replaces the first substring of a string that matches the given regular expression with the given replacement string. String.replaceFirst is a heavy method because each time it is invoked a pattern matcher of a regular expression is generated. Often programmers use a given method without realizing that it is a heavy method when compared to alternative, lighter methods (hereinafter referred to at times as "light" or "bypass" methods). This is one of the reasons that some Java applications are slow.

For some specific argument values of a method, a simpler (non general-purpose) method can replace a heavy method, and thereby, accelerate a Java application. Disclosed, among the inventive embodiments, is a system for converting a heavy method to a specialized bypass method. The system inspects method invocations when a class is loaded and looks for methods where an argument is constant and matches a pattern that can be accelerated. When such a method is found, the system converts the invocation of the heavy method to an invocation of a pre-defined bypass method.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figures. The specific reference numerals used are provided only to aid in the description and not meant to imply any limitations (structural or functional) on the invention. Unless otherwise explicitly stated, it is understood that the use of specific component, device, or parameter names are exemplary only and not meant to imply any limitations on the invention. The invention can be implemented with different terminology used to describe the components, devices, or parameters herein. Each term used herein is to be given its broadest interpretation given the context in which that term is used.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. As used in the description herein and throughout the claims that follow, the meanings of "and" and "or" include both the conjunctive and disjunctive and may be used interchangeably unless the context clearly dictates otherwise. That is, as used here, the word "or" is generally used in the sense of "and/or". That is, the use of "or" in a list is not used in the exclusive sense. For example, in a list of A, B, C, or D, "or" indicates that a selection from the list could be A, B, C, and D, or A and B, or A and C, or B and D, or just A, just B, just C, just D, and so on. The exclusive sense of "or" will be explicitly pointed out or clearly identifiable in the context of a description. The exclusive sense of "or" refers to a meaning of "or" whereby a list of A, B, or C indicates that selection of one item excludes the others. That is, for example, if A is selected, then B and C are excluded from the selection.

As used here, a virtual machine is a platform-independent, computing component operable on program code, which can implement at least an interpreter or a compiler. The interpreter and compiler perform similar services in that they both ultimately translate program source code to a native machine language comprehensible by the native operating system (OS) and hardware of a given computing platform or data processing system. Various inventive embodiments are described below in connection with currently-known virtual machines that are implemented in software. A particularly popular virtual machine, the Java Virtual Machine (JVM), is used as a representative example of an architecture-neutral and portable language platform in which the principles of the inventive embodiment can be applied. However, it will be readily apparent to those of ordinary skill in the relevant technology that the inventive embodiments can be equally implemented with analogous programming and virtual machine technologies. Therefore, references to Java, Java byte codes, JVMs, etc., are provided for purposes of illustration, and not of limitation.

It is noted that the terms "application," "program," "program code," "code" (and other analogous terminology) are used interchangeably herein, and are used to broadly refer to any computer instructions that can be read and executed by a data processing system.

FIG. 1 depicts a block diagram of data processing system 100. Data processing system 100 is an exemplary computing device that can be configured to perform the functionality of the inventive systems and methods disclosed here. Data processing system 100 can be any computing device capable of processing or transmitting communication signals. In one embodiment, data processing system 100 is a server computing device, personal computing device (e.g., laptop, desktop, etc.), mobile computing device, or any device having computing functionality. In other embodiments, data processing system 100 can be a mobile telephone, cellular phone, radio phone, personal digital assistant, smart phone, etc. Data processing system 100 can be a file server, such as a personal server for a network such as home network, some other Local Area Network (LAN), or a Wide Area Network (WAN). Additionally, data processing system 100 can be a set-top box, digital video disc player, television, personal video recorder, digital video recorder, TiVo device, personal portable server, personal portable media player, network server, or other device capable of storing, accessing, or processing data. Preferably, data processing system 100 includes accelerated Java virtual machine (JVM) 106 having check and conversion module 107, both of which will be described further below.

In one embodiment, data processing system 100 includes at least one processor 105 coupled to system memory 110 via system bus 115. System memory 110 is a lowest level of memory and may include, for example, DRAM, flash memory, etc. Data processing system 100 can include additional volatile memory, such as cache memory, registers, and buffers. I/O controller 120 is coupled to system bus 115 and provides connectivity and control for input devices, such as mouse 125 and keyboard 130, and output devices, such as display 135. Multimedia drive 140 (for example, CDRW or DVD drive) and universal serial bus (USB) hub 145 can be coupled to I/O controller 120. Multimedia drive 140 and USB hub 145 may operate as both input and output (storage) mechanisms. Data processing system 100 can also include storage 150, within which data, instructions, or code can be stored. Network interface device (NID) 155, coupled to system bus 115, enables data processing system 100 to connect to an access communications network 108.

Communications network 108 can be one or more cooperating networks of computers, telephone signals switching stations, satellite links, cellular phone towers, etc., configured to facilitate transmission of data signals between data processing system 100 and other devices (not shown) coupled to communications network 108. In one embodiment, communications network 108 is the Internet, which is a worldwide collection of networks and gateways that use the Transmission Control Protocol/Internet Protocol (TCP/IP) suite of protocols to communicate with one another. In other embodiments, communications network 108 can be a virtual private network, intranet, local area network, wide area network, etc. Communications network 108 can include a broadcast network or a cellular network. A cellular network can include a wireless network and a base transceiver station transmitter, for example. The cellular network can include a second- or third-generation (2G/3G) cellular data communications network, a Global System for Mobile communications network (GSM), or other wireless communication network such as a WLAN network. The examples depicted and discussed are not meant to imply any specific architectural or network limitations with respect to the present invention.

In addition to the above described hardware components of data processing system 100, various features can be provided via software or firmware code or logic stored in system memory 110, or other data storage (for example, storage 150), and executed by processor 105. In one embodiment, data, instructions, or code from storage 150 populates the system memory 110. Thus, system memory 110 can include software or firmware components, such as operating system (OS) 160, Java applications 162, and accelerated JVM 106, which includes check and conversion module 107. OS 160 can be, for example, Microsoft Windows®, GNU®, Linux®, or Advanced Interactive eXecutive (AIX®).

In actual implementation, Java applications 162, accelerated JVM 106, and check and conversion module 107 may be combined as a single application collectively providing the various functions of each individual software component when processor 105 executes the corresponding code. In certain embodiments, processor 105 executes Java applications 162, accelerated JVM 106 and OS 160. It is noted that, depending on the specifics of any given configuration for a specific data processing system, the hardware or software functionality comprised by data processing system 100 can be customized for a specific user, use, or check and conversion module 107 is software code for: (a) storing and providing a pattern table, wherein entries of the pattern table associate a method of a Java class with (i) conditions to be satisfied by an argument of the method, and (ii) a conversion procedure that converts a general purpose Java method to a specific purpose Java method; (b) loading a Java class having at least one general purpose Java method invocation; (c) determining whether the general purpose Java method invocation corresponds to a Java method included in the pattern table; (c) upon determining that the general purpose Java method is included in the pattern table, determining whether an argument of the general purpose Java method invocation satisfies the conditions associated with the method in the pattern table, wherein said conditions include that the argument is constant, is at a position specified by the pattern table, and matches a specified pattern; and (d) upon determining that the argument matches the conditions, replacing the general purpose Java method invocation with a specific purpose Java method invocation according to the conversion procedure specified in the pattern table.

Depending on the specific embodiment, accelerated JVM 106 and check and conversion module 107 can include some or all of the listed code functions (a)-(d). According to the illustrative embodiment, when processor 105 executes accelerated JVM 106, data processing system 100 initiates a series of processes that enable the above functional features as well as additional features or functionality, which are described below with reference to FIGS. 2-7. It should be noted that although the inventive embodiments are described here in the context of the Java programming language, and JVMs in general, the inventive processes and systems described here can be applied to other programming languages and computing environments that process instructions which are platform independent. In such a case, a virtual machine on a data processing system can interpret the instructions or send the instructions to a compiler to generate code suitable for execution by the data processing system in which the virtual machine is instantiated.

Figure 2:
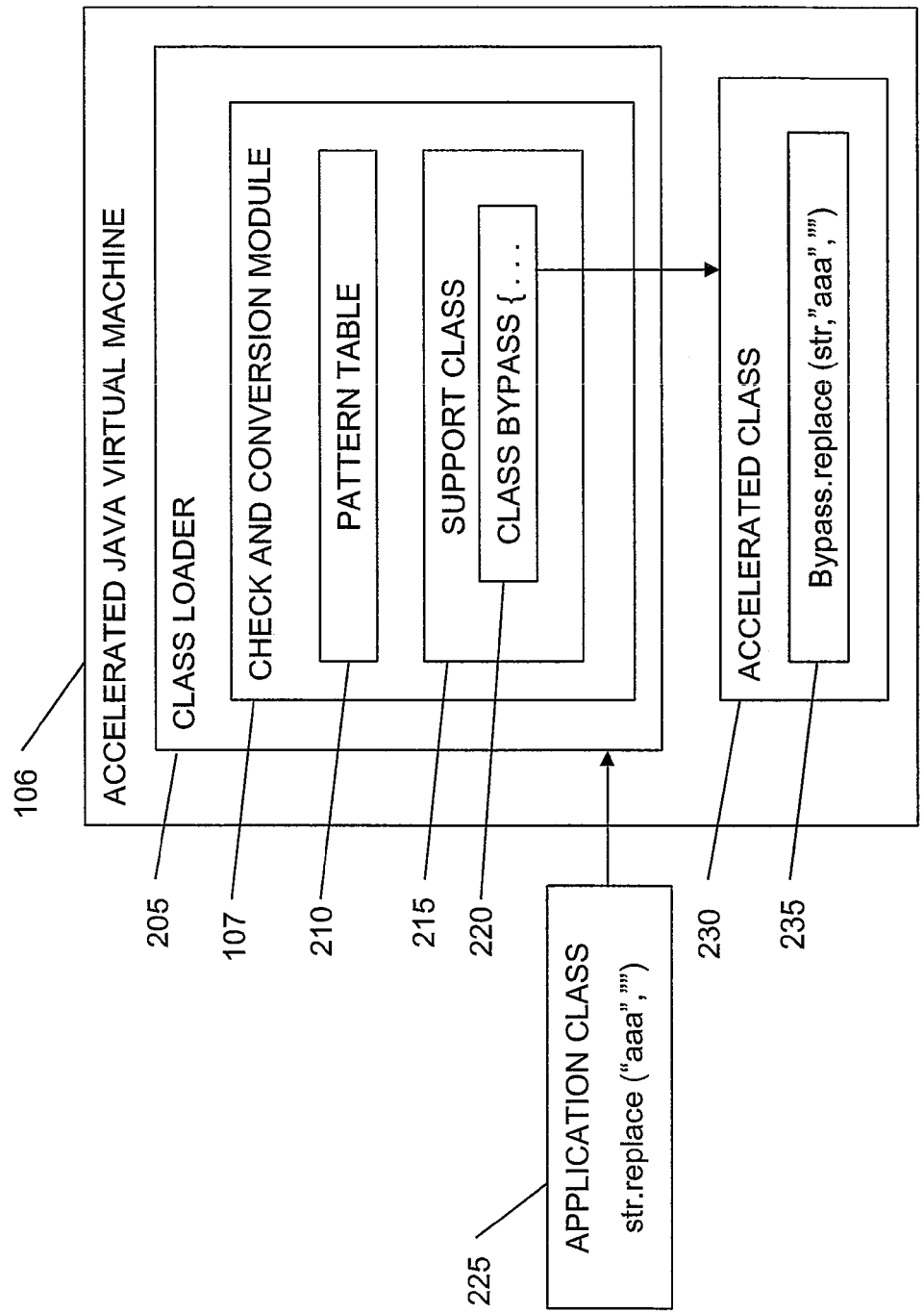
FIG. 2 is a block, schematic diagram of certain components that can be used with the data processing system of FIG. 1.

Referring to FIG. 2 now, accelerated JVM 106 is provided with class loader 205, which includes methods for loading new classes into the Java runtime environment. Loading of a class file is part of a process that also includes linking and initialization. During loading a binary form for a type in brought into a JVM. In Java, variables and expressions have a type while objects and arrays have a class. Linking involves verification, preparation, and resolution. Verification ensures that a type is properly formed and fit for use by the JVM. Preparation involves allocating memory needed by the type. Resolution is the process of transforming symbolic references in a constant pool to direct references. The constant pool is an ordered set of constants used by the type, including literals (string, integer, and floating point constants) and symbolic references to types, fields, and methods. In initialization, class variables are given their proper initial values. The inventive processes and systems disclosed here perform reconfiguration of a class prior to the first execution of the methods being reconfigured for optimization.

In one embodiment, class loader 205 includes check and conversion module 107. Pattern table 210 and support class module 215 are included with check and conversion module 107. Examples of pattern table 210 are provided below. Support class 215 includes a number of bypass classes 220, examples of which are provided below. During operation, when application class 225 of a Java application is invoked, class loader 205 begins the process of loading application class 225 into JVM 106. Check and conversion module 107 evaluates each method invocation of application class 225 against pattern table 210. In one embodiment, when the name of a method of application class 225 is found in pattern table 210, check and conversion module determines whether an argument of the method found in pattern table 210 meets certain conditions, which conditions will be further detailed below. If the argument meets the conditions, application class 225 is converted to accelerated class 230 by substituting the method invocation of application class 225 with bypass class method invocation 235 according to a conversion procedure specified in pattern table 210. During subsequent operation, when application class 225 is invoked, JVM 106 executes accelerated class 230 instead of application class 225.

Figure 3:
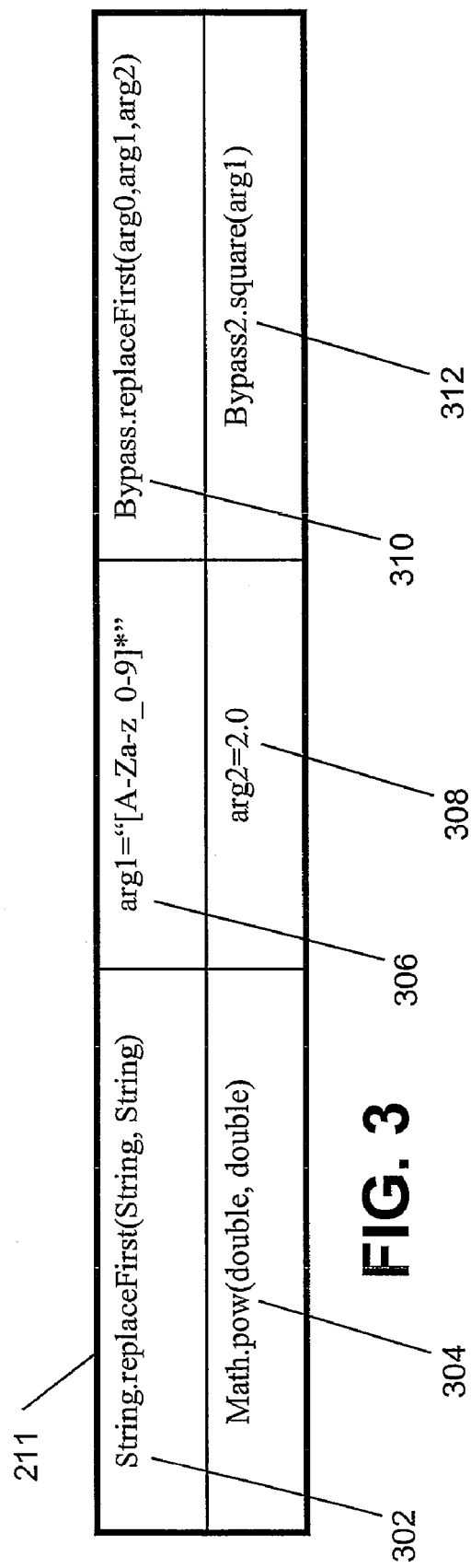
FIG. 3 shows an exemplary data structure that can be used with some of the components of FIG. 2.

FIG. 3 shows exemplary pattern table 211, which is an implementation of pattern table 210 of FIG. 2. The first column of pattern table 211 includes names (method signatures) of convertible methods 302 and 304. The second column of pattern table 211 includes convertible argument patterns 306 and 308 (that is, a pattern specified for a given argument of a method listed in the first column of pattern table 211). Sample criteria that define a specific argument pattern are provided below. The third column of pattern table 211 includes conversion procedures 310, 312 that specify how methods 302, 304 of application class 225 is converted or reconfigured to generate optimized methods 310, 312 of accelerated class 230. By way of example, the first row of pattern table 211 shows a specification for reconfiguring method String.replaceFirst 302. Argument pattern 306 specifies that an argument of String.replaceFirst 302 be only of an alpha-numerical type. It should be understood, however, that it is also possible to specify a string without special characters, that is, "\.,-^$&!?*+[ ]{ }( )" by specifying an argument pattern such as arg1="[^\\\.\,\-\^\$\&\!\/\\*\+\[\]\{\}\(\)]*". In object oriented programming languages, usually, parameters refer to variables listed in the method's declaration, while arguments are the actual values that are passed when a method is invoked. When a method is invoked, the arguments used must match in type and order the parameters of the method's declaration. FIG. 4A depicts an exemplary support class 222 ("Bypass") that check and conversion module 107 uses according to conversion procedure 310 of pattern table 211. When the first argument of String.replaceFirst is composed only of alpha-numerals, support class 222 is used and processing is accelerated.

General purpose method Math.pow(a,b) 304 is another example of possible entries in pattern table 211. General method Math.pow(a,b) 304 takes two floating point values "a" and "b" as arguments, wherein the value of the first argument "a" is raised to the power of the second argument "b". However, since "b" can be an arbitrary value (such as −1.3), general method Math.pow(a,b) 304 is heavy. Hence, pattern table 211 provides information for identifying general method Math.pow(a,b) 304 and replacing it with specific, lighter method Bypass2.square(arg1) 312. According to pattern table 211, when general method Math.pow(a,b) 304 is found in a class that is being loaded, and when the second argument (in this case "b") is equal to 2.0, then general method Math.pow(a,b) 304 is replaced according to the information provided by accelerated method Bypass2.square (arg1) 312. FIG. 4B depicts an exemplary support class 224 ("Bypass2") that check and conversion module 107 uses according to conversion procedure 312 of pattern table 211. When the second argument of general method Math.pow(a,b) 304 is 2.0, support class 224 is used and processing is accelerated. That is, according to the specification of pattern table 211, an invocation of general method Math.pow(x, 2) is converted into Bypass2.square(x) to be processed as a simple multiplication. It should be noted that argument "b" is a constant.

Pattern table 213 of FIG. 5A provides yet another example of criteria for the pattern of an argument to be found in a given general method. Thus, for general method Math pow(a,b) 304, pattern table 213 requires that the second argument of general method Math.pow(a,b) 304 be an integer with a value of 1 to 10, according to Check.is1to10(arg2) 309. FIG. 5B shows corresponding Check class 227 and Bypass3 class 229 that can be used based on information from pattern table 213. When the second argument of general method Math.pow(a,b) 304 is an integer 1 to 10, and is constant, general method Math.pow(a,b) 304 is replaced with Bypass3.pow1to10(arg1, (int)arg2) 313 upon invocation of general method Math.pow (a,b) 304. Thus, a method invocation "y=Math.pow(x, 3.0)" can be converted into "y=Bypass3.pow1to10(x, 3)", thereby providing high-speed processing.

FIGS. 6A and 6B show another specific example of a code conversion that can be performed with accelerated JVM 106. Original program 250 is a typical example of a general purpose method (String.replaceFirst) used for removing the word "get" from strings. Check and conversion module 107 converts original program 250 into bypass program 252. It should be noted that, after conversion, Bypass.replaceFirst is used in the bypass program 252 instead String.replaceFirst of original program 250.

Figure 7:
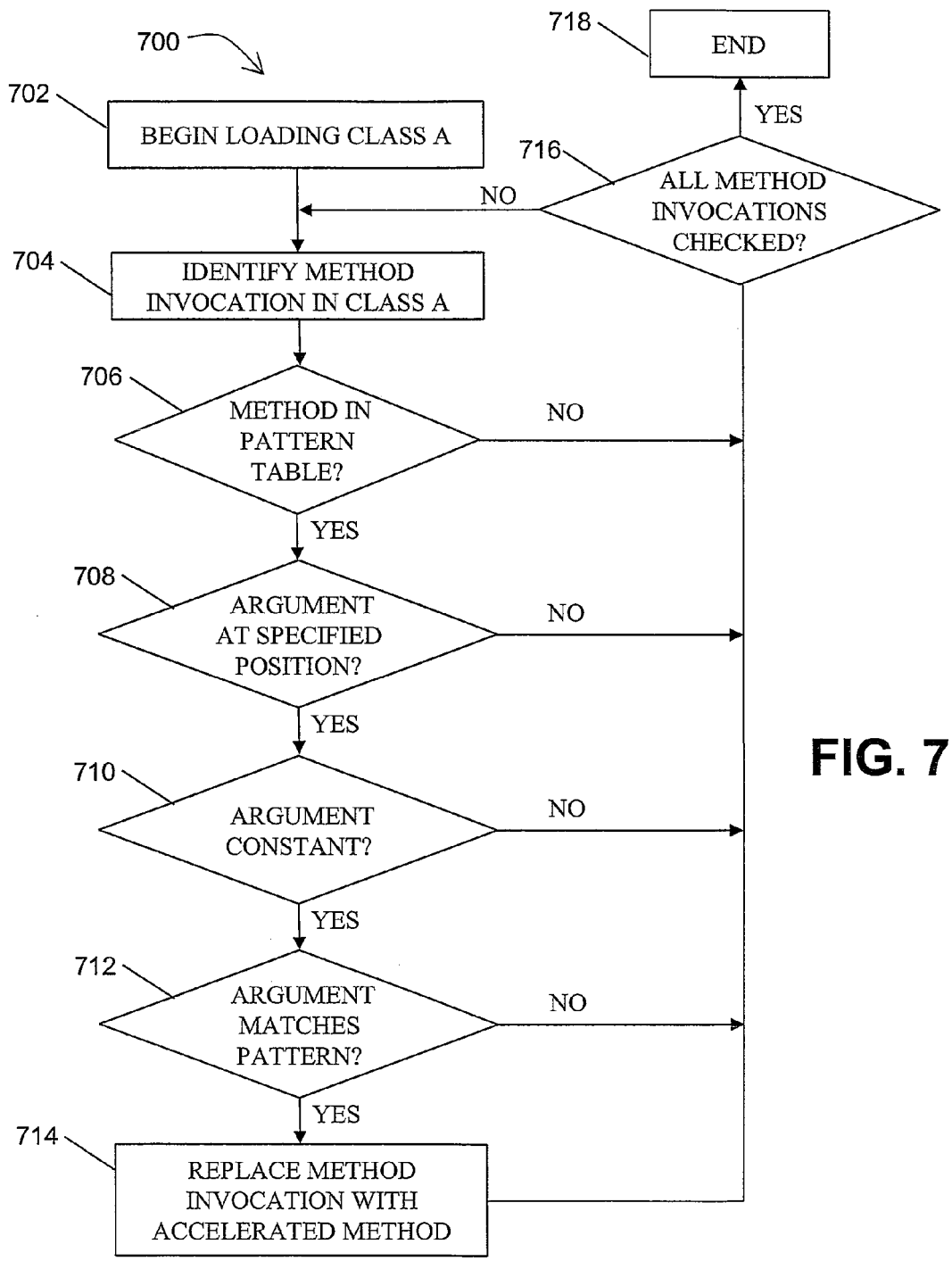
FIG. 7 is a flowchart of a process that can be used in conjunction with the data processing system of FIG. 1 and the components of FIG. 2.

With reference to FIG. 7 now, a process 700 that can be implemented in data processing system 100 generally, and in conjunction with accelerated JVM 106 more specifically, will be described. In one embodiment, process 700 facilitates the optimization, or improvement, of the performance of a Java application by converting general purpose method invocations to specific purpose method invocations. Before detailing specifically process 700, the following provides a general summary of process 700. The conversion is performed during class loading and before execution of the methods being loaded. In one embodiment, method conversion is based upon an argument of a given general purpose method meeting pre-determined criteria. When a given general purpose method has an argument that meets the pre-determined criteria, the general purpose method invocation is replaced with a specific purpose method invocation, thereby converting an original, heavy method into an accelerated method. In some embodiments, the argument pattern required by the predetermined criteria calls for the argument being at a specific location, being constant, or fitting a specific type or form that can be accelerated. At run time, the converted, specific purpose method is executed instead of the general purpose method.

In preparation for performing the process 700, it is preferable that data processing system 100, or accelerated JVM 106, or similar systems, be provided. Specifically, a pattern table (such as pattern table 211 or 213) and support classes (such as support classes 222, 224, and 229) are preferably configured and made accessible. Process 700 starts with class loader 205 loading a class A of a Java program (702). Check and conversion module 107 inspects class A to identify method invocations in class A (704). For a given identified method, it is inquired (706) whether the method is named (that is, appears) in a pattern table, such as the pattern table 211 for example. The methods included in the pattern table are methods that can possibly be accelerated. If the method is not listed in the pattern table, process 700 continues to decision step 716. If the method is named in the pattern table, it is determined whether the method includes a given argument at a specified position in an argument list of a method call (708). If the argument is not at the specified position, process 700 continues to decision step 716. However, if the argument is at the specified position, it is then determined whether the argument has a constant value (710). If the argument does not have a constant value, process 700 continues to decision step 716. If the argument has a constant value, it is determined whether the argument matches a pre-determined form, type, or pattern specified in the pattern table (712). If the argument does not match the pattern, process 700 continues to decision step 716. If, however, the argument matches the pattern specified in the pattern table, the original method is converted to an accelerated method in accordance with a specification provided in the pattern table. Examples of such specifications and conversions are illustrated in FIG. 3, FIGS. 4A-4B, and FIGS. 5A-5B, for example.

At decision step 716 it is determined whether all the method invocations associated with class A have been inspected. If all the method invocations have not been checked, process 700 continues identifying method invocations of class A for inspection (704). If all the method invocations have been checked, process 700 ends (718). After the method conversion process of 700, upon subsequent invocations of class A, the accelerated methods are used.

Thus, the inventive embodiments disclose here facilitate examination of the applicability of program code conversion and improve execution speed of programs by providing high-speed code to replace heavy methods, wherein the heavy methods include arguments that exhibit pre-determined patterns. In some embodiments, the name of a method invoked and the argument patterns only statically checked; hence, it is possible to incorporate the method name and argument pattern inspection into a class loader without sacrificing performance. Because the replacement code can be provided in advance in a support class, using a faster method available only in the case of a special argument pattern identified by the pattern table, it is possible to accelerate a given program compared to its execution with general purpose method. In one embodiment, a high-speed bypass is incorporated into a method itself (for example, String.replaceFirst). In such a case, whether a certain argument of the method call matches pre-specified conditions is checked after the method is invoked. In embodiments where the possibility of acceleration is checked at the time of conversion, there is no overhead occurs at the time of execution. Additionally, accelerated JVM 106 can be used even where alteration of the original method is not allowed because, upon invocation of the original class, a support class is used automatically instead of the original class.

In the flow charts and/or functional block diagrams above, one or more of the methods can be embodied in a computer writable and/or readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware, or hardware. As a preparatory step to practicing the invention in software, the programming code (whether software or firmware) will typically be stored in one or more machine readable and writable storage media such as fixed (hard) drives, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device, or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of accelerating the execution of a computing task by converting a general purpose Java method invocation to a more specific purpose Java method invocation, the method of accelerating comprising the steps of:

providing a pattern table, wherein each record entry of said pattern table associates a named method of a Java class with: (a) conditions to be satisfied by an argument of said named method, and (b) a conversion procedure that converts a general purpose Java method invocation to a specific purpose Java method invocation;

loading a Java class having at least one general purpose Java method invocation;

determining whether the general purpose Java method corresponds to a named method of a Java class included in said pattern table;

upon determining that the general purpose Java method is included in said pattern table as a named method of a Java class, determining whether an argument of the general purpose method satisfies the conditions associated with said named method of a Java class, wherein said conditions include at least that the argument is constant, that the argument is at a position specified by the pattern table, and that the argument matches a specified pattern;

upon determining that said argument matches said conditions, replacing the general purpose method invocation with a specific purpose Java method invocation according to the conversion procedure specified in the pattern table.

* * * * *